(12) United States Patent
Gu et al.

(10) Patent No.: US 11,797,987 B2
(45) Date of Patent: Oct. 24, 2023

(54) BLOCKCHAIN TRANSACTION PROCESSING

(71) Applicant: VeChain Foundation Limited, Singapore (SG)

(72) Inventors: Jianliang Gu, Shanghai (CN); Bin Qian, Shanghai (CN); Ziheng Zhou, Shanghai (CN)

(73) Assignee: VeChain Foundation Limited, Singapore (SG)

( * ) Notice: Subject to any disclaimer, the term of this patent is extended or adjusted under 35 U.S.C. 154(b) by 86 days.

(21) Appl. No.: 15/733,757

(22) PCT Filed: Apr. 18, 2019

(86) PCT No.: PCT/SG2019/050223
§ 371 (c)(1),
(2) Date: Oct. 19, 2020

(87) PCT Pub. No.: WO2019/203736
PCT Pub. Date: Oct. 24, 2019

(65) Prior Publication Data
US 2021/0241282 A1 Aug. 5, 2021

Related U.S. Application Data

(60) Provisional application No. 62/664,981, filed on May 1, 2018, provisional application No. 62/659,917, filed on Apr. 19, 2018.

(51) Int. Cl.
*G06Q 20/40* (2012.01)
*G06Q 20/06* (2012.01)
(Continued)

(52) U.S. Cl.
CPC ....... *G06Q 20/401* (2013.01); *G06Q 20/0655* (2013.01); *G06Q 20/085* (2013.01);
(Continued)

(58) Field of Classification Search
CPC ..... G06Q 20/00–425; G06Q 30/00–08; G06Q 40/00–128; G06Q 2220/00–18;
(Continued)

(56) References Cited

U.S. PATENT DOCUMENTS 5,953,710 A * 9/1999 Fleming ............... G06Q 20/405
235/380
9,876,877 B2 * 1/2018 Huang ................... H04L 67/63
(Continued)

FOREIGN PATENT DOCUMENTS

WO   WO-2015163806 A1 * 10/2015 ......... H04L 12/1478
WO   2017145047 A1   8/2017

OTHER PUBLICATIONS

Buterin, Vitalik "Ethereum: A Next Generation Smart Contract and Decentralized Application Platform", ethereum.org, https://ethereum.org/669c9e2e2027310b6b3cdce6e1c52962/Ethereum_Whitepaper_-_Buterin_2014.pdf, 2014 (Year: 2014).*
(Continued)

*Primary Examiner* — John W Hayes
*Assistant Examiner* — Chenyuh Kuo
(74) *Attorney, Agent, or Firm* — Downs Rachlin Martin PLLC

(57) ABSTRACT

Embodiments of the present disclosure relate to methods, devices, a computer readable storage medium and a computer program product for processing or managing a blockchain transaction. In a method for processing a blockchain transaction, a blockchain node of a blockchain for processing the blockchain transaction receives a transaction request, the transaction request indicating at least a initiator of the transaction, transaction content and a transaction recipient of the transaction. The blockchain node computes, based on the transaction content, a transaction fee for processing the transaction. The blockchain node determines whether the
(Continued)

initiator of the transaction is a sponsored user of the transaction recipient, and determines a payment account from which the transaction fee is deducted in response to determining that the initiator of the transaction is a sponsored user of the transaction recipient. The transaction processing and management schemes as provided in the present disclosure enable ordinary users use blockchain services conveniently.

26 Claims, 7 Drawing Sheets

(51) Int. Cl.
| | |
|---|---|
| *G06Q 20/08* | (2012.01) |
| *G06Q 20/38* | (2012.01) |
| *G06Q 40/03* | (2023.01) |
| *G06Q 30/0283* | (2023.01) |
| *H04L 9/32* | (2006.01) |
| *G06F 16/27* | (2019.01) |

(52) U.S. Cl.
CPC ......... *G06Q 20/381* (2013.01); *G06Q 20/389* (2013.01); *G06Q 20/3825* (2013.01); *G06Q 20/3829* (2013.01); *G06Q 20/4037* (2013.01); *G06Q 30/0283* (2013.01); *G06Q 40/03* (2023.01); *H04L 9/3247* (2013.01); *G06F 16/27* (2019.01); *G06Q 2220/00* (2013.01); *H04L 2209/56* (2013.01)

(58) Field of Classification Search
CPC ....... H04L 9/00–38; H04L 2209/00–88; G06F 16/00–986
See application file for complete search history.

(56) References Cited

U.S. PATENT DOCUMENTS

| | | | | |
|---|---|---|---|---|
| 10,055,715 | B1* | 8/2018 | Grassadonia | G06Q 20/4012 |
| 10,237,080 | B2* | 3/2019 | Wu | H04M 15/8214 |
| 10,299,128 | B1* | 5/2019 | Suthar | H04M 15/66 |
| 10,313,532 | B2* | 6/2019 | Neal | G06Q 20/405 235/380 |
| 2010/0223184 | A1* | 9/2010 | Perlman | G06Q 20/04 705/44 |
| 2015/0348017 | A1 | 12/2015 | Allmen | |
| 2016/0342989 | A1 | 11/2016 | Davis | |
| 2017/0154331 | A1 | 6/2017 | Voorhees | |
| 2017/0372417 | A1 | 12/2017 | Gaddam et al. | |
| 2018/0075527 | A1* | 3/2018 | Nagla | G06Q 40/025 |
| 2019/0140935 | A1* | 5/2019 | Kikinis | G06F 30/20 |
| 2019/0228397 | A1* | 7/2019 | Madden | G06N 20/00 |
| 2019/0228461 | A1* | 7/2019 | Domokos | G06Q 30/0201 |
| 2021/0119785 | A1* | 4/2021 | Ben-Reuven | H04L 63/126 |
| 2022/0021538 | A1* | 1/2022 | Madisetti | H04L 63/105 |

OTHER PUBLICATIONS

Vitalok Buterin, Ehtereum White Paper, A Next Generation Smart Contract & Decentralized Application Platform, Year 2014, ethererum.org, pp. 12-14 (Year: 2014).*
PCT International Search Report and Written Opinion dated Jul. 31, 2019 in International Application No. PCT/SG2019/050223.
Anonymous: "Blockchain—Wikipedia," https://en.wikipedia.org/w/index.php?title=Blockchain&oldid=810512431#Alternativeblockcains. Nov. 15, 2017 (retrieved on Apr. 2, 2019).
Anonymous: "How to pay transaction costs for other people—Ethereum Stack Exchange," https://ethereum.stackexchange.com/questions/38584/how-to-pay-transaction-costs-for-other-people. Feb. 5, 2018 (retrieved on Jul. 19, 2019).

* cited by examiner

US 11,797,987 B2

BLOCKCHAIN TRANSACTION PROCESSING

FIELD

Embodiments of the present disclosure generally relate to the field of transaction processing on a blockchain, and more particularly to processing or managing blockchain transactions.

BACKGROUND

In traditional blockchain transaction processing schemes, whenever individuals or companies want to use blockchain services for transferring cryptocurrency or calling and executing a smart contract, they have to send a transaction to the network, and pay a transaction fee required for processing the blockchain transaction by using their own account balance.

For some blockchain applications, an initiator of a transaction may be an ordinary user. The user would have to face the high price volatility when he/she obtains cryptocurrency from the market. Therefore, the traditional transaction management scheme is not convenient for the ordinary user to pay transaction fees for processing blockchain transactions. Moreover, for a transfer transaction, an amount of cryptocurrency needs to be transferred from an initiator of the transaction to the transaction recipient. The blockchain transaction fee and the amount to be transferred may be in different types of cryptocurrencies, which requires the users to have at least two types of cryptocurrencies and get familiar with various types of tools for managing their cryptocurrencies so as to ensure that their account balances are sufficient for the transaction fees and the amounts to be transferred. Therefore, the traditional transaction processing schemes cause lots of burden for ordinary users to use blockchain applications.

SUMMARY

In general, example embodiments of the present disclosure provide a solution for processing or managing a blockchain transaction, by which blockchain services can be used conveniently by an ordinary user.

According to a first aspect of the present disclosure, there is provided a method for processing a blockchain transaction. The method includes: at a blockchain node of a blockchain for processing the blockchain transaction, receiving a transaction request, the transaction request indicating at least a transaction initiator, transaction content and a transaction recipient of the transaction; computing, based on the transaction content, a transaction fee for processing the transaction; determining whether the transaction initiator is a sponsored user of the transaction recipient; and in response to determining that the transaction initiator is a sponsored user of the transaction recipient, determining a payment account from which the transaction fee is deducted.

According to a second aspect of the present disclosure, there is provided a method for managing a blockchain transaction. The method includes: at a management device for managing the blockchain transaction, receiving a request from a transaction initiator of the transaction, the request indicating at least the transaction initiator, transaction content and a transaction recipient of the transaction; determining whether the transaction initiator is a sponsored user of the transaction recipient; and in response to determining that the initiator of the transaction is a sponsored user of the transaction recipient, forming a transaction request by generating and adding signature information of the transaction recipient to the received request, the signature information indicating that a transaction fee for a blockchain node of a blockchain processing the blockchain transaction is allowed to be deducted from a payment account associated with the transaction recipient.

According to a third aspect of the present disclosure, there is provided a device for processing a blockchain transaction. The device includes a memory configured to store one or more programs; and a processing unit coupled to the memory and configured to execute said one or more programs to cause the device to perform steps of the method in the first aspect of the present disclosure.

According to a fourth aspect of the present disclosure, there is provided a device for managing a blockchain transaction. The device includes: a memory configured to store one or more programs, and a processing unit coupled to the memory and configured to execute said one or more programs to cause the device to perform steps of the method in the second aspect of the present disclosure.

According to a fifth aspect of the present disclosure, there is provided a non-transitory computer readable storage medium on which machine executable instructions are stored, the machine executable instructions, when executed, causing a machine to perform steps of the method of any of the first and second aspects of the present disclosure.

According to an sixth aspect of the present disclosure, there is provided a computer program product. The computer program product is tangibly stored on a non-transient computer readable medium and comprises machine executable instructions, the machine executable instructions, when executed, causing a machine to perform steps of the method of any of the first and second aspects of the present disclosure.

It is to be understood that the summary is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

The above and other objects, features and advantages of the present disclosure will be made more apparent by describing exemplary embodiments of the present disclosure in more detail with reference to figures, wherein identical reference signs represent identical parts in the exemplary embodiments of the present disclosure.

In each drawing, same or corresponding signs indicate the same or corresponding components.

DETAILED DESCRIPTION

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such a feature, structure, or characteristic in connection with other embodiments whether or not explicitly described.

It shall be understood that although the terms "first," "second," "third" and "fourth" etc. may be used herein to describe various elements, these elements should not be limited by these terms. These terms are only used to distinguish one element from another. For example, a first element could be termed as a second element, and similarly, a second element could be termed as a first element, without departing from the scope of example embodiments. For example, in the following description, the first, second, third and fourths account only intend to distinguish different accounts of different entities, rather than any intention of limitation of the number or order of the accounts. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

Figure 1:
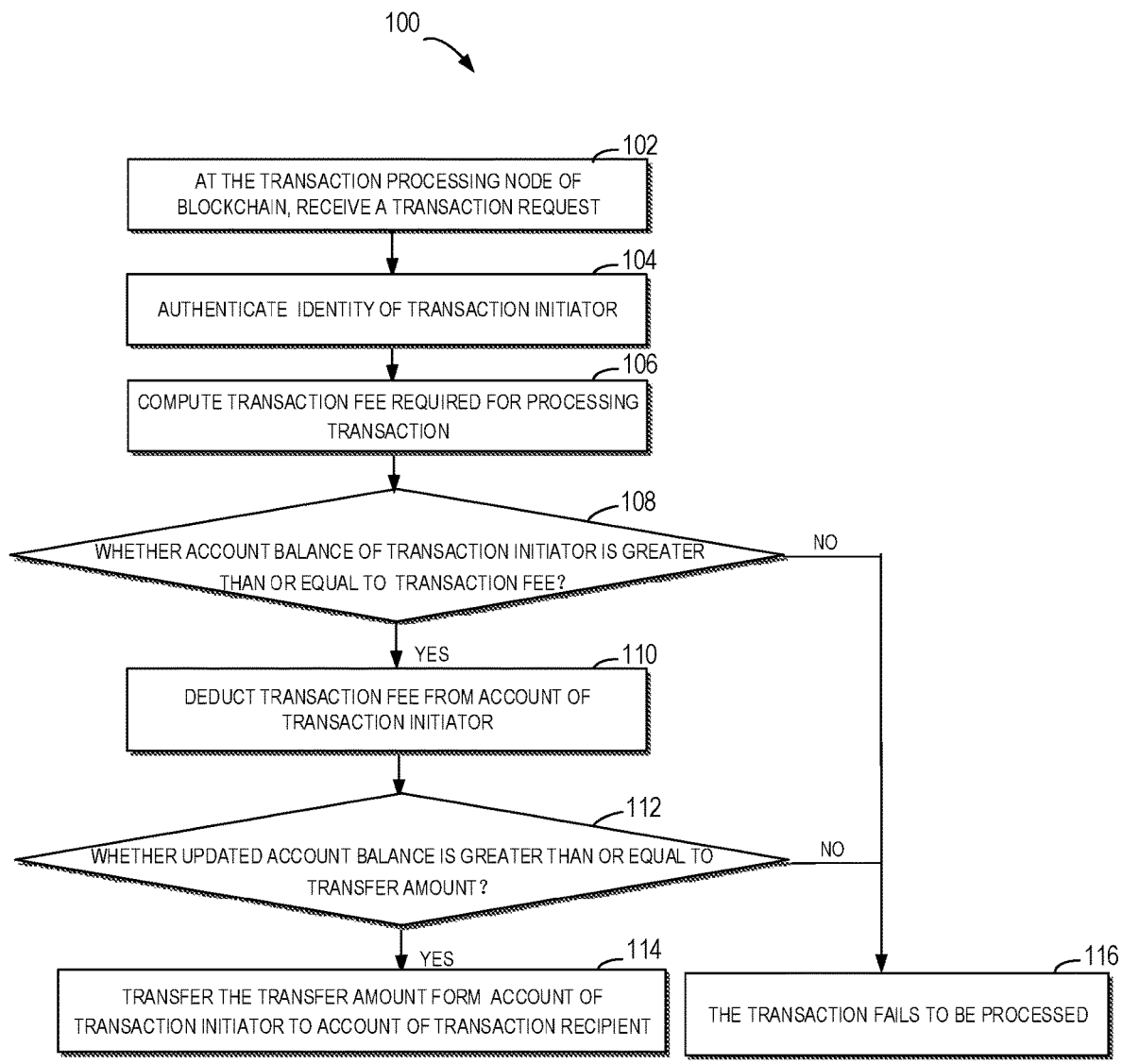
FIG. 1 illustrates a flowchart of a transaction processing method in the prior art.

FIG. 1 illustrates a flowchart of a transaction management method 100 in the prior art. As shown in FIG. 1, at block 102, a transaction processing node of a blockchain receives a transaction request. For example, the transaction request indicates a transfer transaction to transfer an amount of cryptocurrency from a transaction initiator to a transaction recipient. At block 104, the transaction processing node authenticates the identity of the transaction initiator. At block 106, the transaction processing node computes a transaction fee for processing the transaction. At block 108, the transaction processing node determines whether the account balance of the transaction initiator is greater than or equal to the computed transaction fee. If the result of the determination in block 108 is No, the method 100 goes to block 116 where it is determined that the processing of the transaction is failed. If the result of the determination in block 108 is Yes, that is, the account balance of the transaction initiator is greater than or equal to the computed transaction fee, at block 110, the transaction processing node deducts the transaction fee from the account of the transaction initiator. Then, if the transaction request indicates a transfer transaction to transfer an amount of cryptocurrency from the transaction initiator to the transaction recipient, at block 112, the transaction processing node determines whether the updated account balance of the transaction initiator is greater than or equal to the amount to be transferred. If the result of the determination in block 112 is Yes, at block 114, the transaction processing node transfers the amount of cryptocurrency from the account of the transaction initiator to the account of the transaction recipient. If the result of the determination in block 112 is No, that is, the updated account balance of the transaction initiator is less than the amount to be transferred, the method 100 goes to block 116 where it is also determined that the processing of the transaction is failed.

As stated above, in the traditional transaction processing schemes, a transaction fee for processing the transaction can only be paid by the transaction initiator. If the account balance of the initiator is less than the required transaction fee or less than the amount to be transferred, the processing of the transaction will fail. In addition, in many blockchain systems, the blockchain transaction fee and the amount to be transferred may be in different types of cryptocurrencies. In this case, the transaction initiator needs to have at least two types of cryptocurrencies and get familiar with at least two types of tools for managing their cryptocurrencies so as to ensure their account balances are sufficient for the transaction fee and the amount to be transferred. Therefore, the traditional transaction processing schemes cause lots of burden for ordinary users.

In order to at least partially address one or more of the above problems, as well as other potential problems, an example embodiment of the present disclosure proposes a transaction processing solution. In the solution, a blockchain node of a blockchain for processing the blockchain transaction receives a transaction request indicating at least the transaction initiator, the transaction content and the transaction recipient of the transaction. The blockchain node computes, based on the transaction content, a transaction fee for processing the transaction, and determines whether the transaction initiator is a sponsored user of the transaction recipient. In response to determining that the transaction initiator is a sponsored user of the transaction recipient, the blockchain node determines a payment account from which the transaction fee is deducted. The transaction processing solution as provided in the present disclosure enables ordinary users to use blockchain services conveniently.

Unlike the traditional transaction processing schemes in which blockchain transaction fee can only be paid by the transaction initiator, in the above solution, by determining that the transaction initiator is a sponsored user of the transaction recipient, the transaction processing node may determine a payment account from which the transaction fee is deducted. The blockchain transaction fee may be paid by the determined payment account (for example, any one of a sponsor account, an account of the transaction recipient, or an account of the transaction initiator). In this way, the ordinary users may use the blockchain service like the current ordinary Apps without paying any special attention to use/manage their cryptocurrencies to pay for the transaction fee. Therefore, the present disclosure provides greater convenience for ordinary users to use blockchain services and for companies with multiple different blockchain services to manage these services, which will encourage more users to use the blockchain services.

Figure 2:
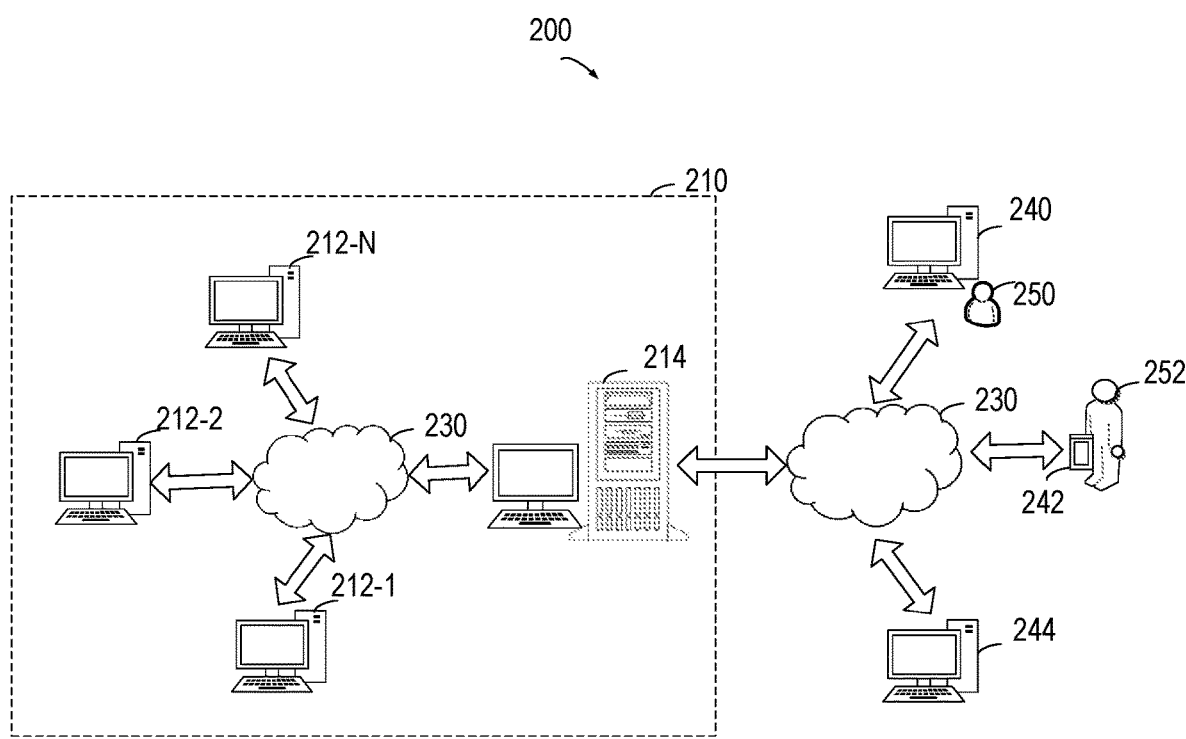
FIG. 2 illustrates an architecture diagram of a transaction processing system according to embodiments of the present disclosure.

FIG. 2 illustrates an architecture diagram of a transaction processing system 200 according to embodiments of the present disclosure. As shown in FIG. 2, the system 200 comprises a management device 214, a plurality of nodes 212-1, 212-2 to 212-N for processing blockchain transactions (i.e., transaction processing nodes 212), and a plurality of terminal devices (e.g., a mobile phone 242, the computers 240 and 244). The management device 214 and the transaction processing nodes 212 may all be blockchain nodes of the blockchain platform 210. The management device 214, the transaction processing nodes 212 and the terminal devices may perform data interaction via the network 230.

It is to be understood that the number of the blockchain nodes and that of the terminal devices are only for the purpose of illustration without suggesting any limitations. The system 200 may include any suitable number of blockchain nodes and terminal devices suitable for implementing embodiments of the present disclosure.

The terminal device may be any end device that may include, but not limited to, a mobile phone, a cellular phone, a smart phone, a voice over IP (VoIP) phone, a wireless local loop phone, a tablet, a personal digital assistant (PDA), a portable computer, a desktop computer, etc. . . . The user 250 or 252 may initiate a transaction through corresponding terminal device 240 or 242 and the terminal device may transmit a corresponding transaction request to the management device 214 for a service associated with a recipient address of the management device 214. In some embodiments, a wallet application can be run on the terminal device. The user 250 or 252 may register with the management device 214 through the wallet application to obtain an associated account ID that uniquely identifies the user at the management device 214. The associated account ID may be for example but not limited to a combination of the user's identification (such as a mailbox or mobile phone number) and the identification of the management device 214 or the operator of the management device 214. Furthermore, the user 250 or 252 may generate their own addresses through the wallet application to act as the initiator address or recipient address for their blockchain transactions. In some embodiments, the terminal device may generate the signature information about the transaction request by signing the transaction request with a private key of the user. The user may become a sponsored user of a transaction recipient by registering with a smart contract of the transaction recipient dedicated for sponsoring payment of the transaction fee.

The management device 214 may be a network device for acting as a node of the blockchain platform 210. The management device 214 may include, but not limited to, one or more computers or servers. The management device 214 may receive transaction requests from the users 250 and 252 via respective terminal devices. The management device 214 may provide blockchain services for the users 250 and 252 via their addresses. For example, it is assumed that the user 252 is a sponsored user of the transaction recipient, who has registered with the recipient address of the transaction recipient and signed a smart contract of sponsoring payment with the transaction recipient. In other words, a sponsored user of the transaction recipient is not only registered with the transaction recipient (the management device 214, for example) as a registered user of the transaction recipient, but also is specifically registered with a smart contract of the transaction recipient dedicated for sponsoring payment of transaction fees for transactions initiated by the user to the transaction recipient. It is also assumed that the user 250 is just an ordinary registered user of the transaction recipient but is not a sponsored user of the recipient. The management device 214 may associate a sponsor account with the transaction recipient during the initialization process of the management device 214. Furthermore, in some embodiments, the management device 214 may also determine credit information for each sponsored user. In some embodiments, the management device 214 may determine that the transaction initiator of a received request is a sponsored user of the transaction recipient, and thereafter it may generate and add signature information to the received request by signing the transaction request with a private key of the transaction recipient to form a transaction request. The management device 214 may further distribute the transaction request with the signature information on the blockchain platform 210, or transmit the transaction request with the signature information to any or all of the transaction processing nodes 212. In this case, with the signature information of the transaction recipient, the management device 214 may indicate to the transaction processing node 212 for processing the transaction that the transaction fee for this transaction may be paid by the transaction recipient.

Herein, the management device 214, the transaction recipient, the recipient address and the account of the transaction recipient may be interchangeably used in some embodiments to indicate the blockchain entity to which the present transaction is directed.

Regarding the blockchain platform 210, it is used to process blockchain transactions and deposit transaction result data. Architecturally, the blockchain platform 210 comprises, for example, a basic service layer, a smart contract layer, and a blockchain bottom layer from up to down (not shown). The blockchain platform 210 may comprise the management device 214 and the transaction processing nodes 212. Moreover, the blockchain platform 210 may further include any or all of the terminal devices 240, 242 and 244 if they may act as a blockchain node. In some embodiments, the blockchain platform 210 can be based on a private blockchain, a public blockchain, or a federated blockchain.

The transaction processing node 212 may be a network device for acting as a node of the blockchain platform 210. The transaction processing node 212 for transaction processing (i.e., transaction processing node 212) may include, but not limited to, one or more computers or servers. The transaction processing node 212 may be capable of receiving a transaction request from the management device 214 and computing a transaction fee for processing the transaction based on the received transaction request. When the transaction processing node 212 determines that the initiator of the transaction is a sponsored user of the transaction recipient, it may determine a payment account and deduct the computed transaction fee from the payment account. In some embodiments, the transaction processing node 212 may determine whether the transaction initiator is a sponsored user of the transaction recipient based on signature information of the transaction recipient indicated in the received transaction request or based on a sponsor relationship between the transaction initiator and the transaction recipient. In the latter case, the sponsor relationship may be stored on the blockchain platform 210 or at the transaction processing node 212. In the former case, a similar sponsor relationship may be stored at the management device 214 for the management device 214 to determine whether the transaction initiator is a sponsored user of the transaction recipient.

In some embodiments, if the transaction processing node 212 determines that the transaction initiator is a sponsored user of the transaction recipient, a three-tier payment model of the present disclosure will be used to determine a payment account from which the transaction fee is deducted. The three-tier payment model will be described in detail with reference to FIGS. 3 to 7 below.

On the other hand, if the transaction processing node 212 determines that the transaction initiator is not a sponsored user of the transaction recipient, it may determine whether balance of a first account of the transaction initiator is greater than or equal to the transaction fee. If the balance of the first account of the initiator is greater than or equal to the transaction fee, the transaction processing node 212 may determine the first account of the transaction initiator as the payment account and deduct the transaction fee from the first account of the transaction initiator.

Figure 3:
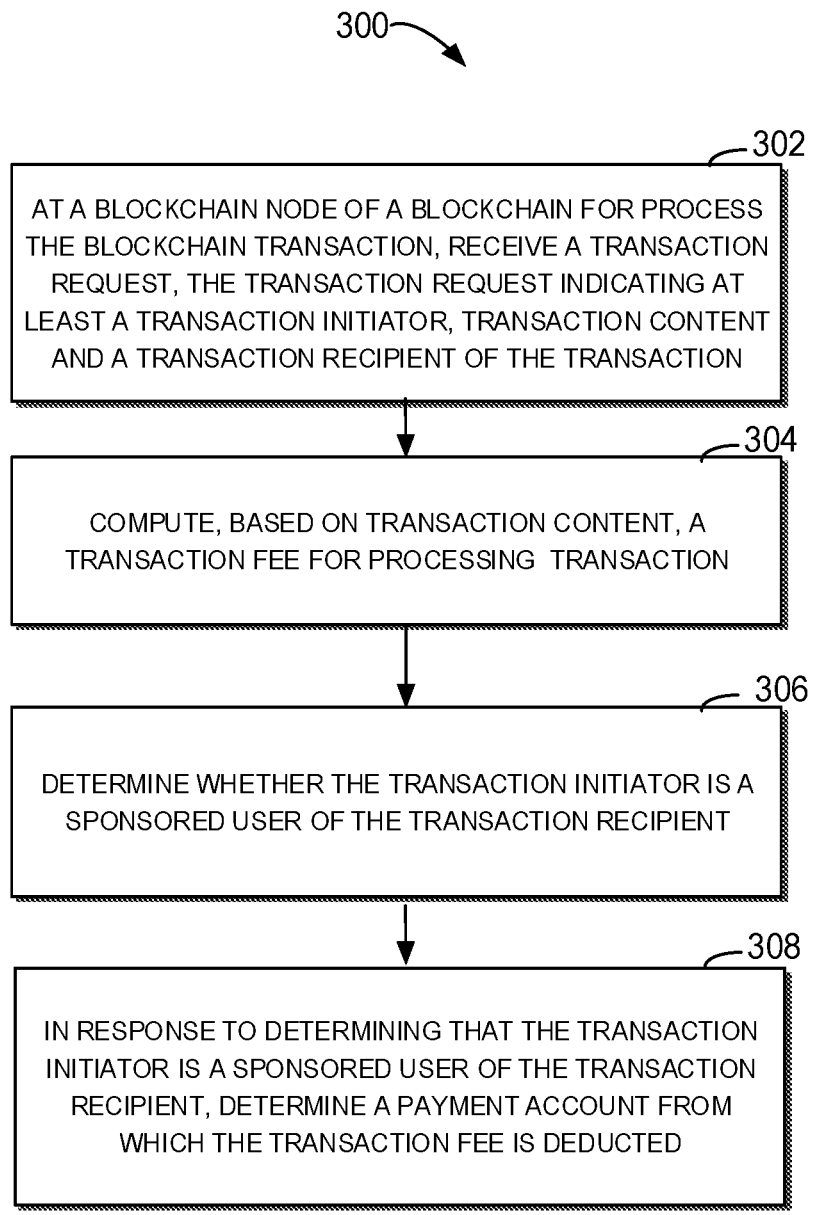
FIG. 3 illustrates a flowchart of a method for processing a blockchain transaction according to embodiments of the present disclosure.

FIG. 3 illustrates a flowchart of a method 300 for processing a blockchain transaction according to embodiments of the present disclosure. In FIG. 3, various actions are performed, for example, by a processor of the transaction processing node 212 as shown in FIG. 2. The method 300 may also include additional actions not shown and/or may omit the actions shown, the scope of the disclosure being not limited in this respect.

At block 302, the transaction processing node 212 receives a transaction request. The transaction request indicates at least a transaction initiator, transaction content and a transaction recipient of a transaction. The transaction request may be received by the transaction processing node 212 from the management device 214 shown in FIG. 2. In some embodiments, the transaction request further indicates signature information of the transaction initiator and/or signature information of the transaction recipient. In some embodiments, the transaction recipient is a business operating system for providing one or more services for the sponsored users or ordinary registered users of the recipient based on a specific smart contract.

At block 304, the transaction processing node 212 computes, based on the transaction content, a transaction fee for processing the transaction. For example, the transaction content may indicate that the transaction is to deploy a new smart contract on the blockchain platform, to call a deployed smart contract or to transfer a transfer amount of cryptocurrency from the transaction initiator to the transaction recipient. In some embodiments, the transaction fee and the transfer amount may be in different types of cryptocurrencies. In some other embodiments, the transaction fee and the transfer amount are both in a same type of cryptocurrency.

At block 306, the transaction processing node 212 may determine whether the transaction initiator is a sponsored user of the transaction recipient.

In some embodiments, the transaction processing node 212 may determine whether the transaction initiator is a sponsored user of the transaction recipient based on signature information of the transaction recipient which is indicated by the received transaction request. In this case, before transmitting the transaction request to the transaction processing node 212, the management device 214 may determine whether the transaction initiator is a sponsored user of the transaction recipient (i.e., the management device 214) based on, for example, a sponsor relationship between the transaction initiator and the transaction recipient stored at the management device 214. In response to determining that the transaction initiator is a sponsored user of the transaction recipient, the management device 214 may further add a signature on the request received from the corresponding terminal device of the transaction initiator. The signature may be generated by the management device 214 signing the transaction content with a private key of the management device 214. In this way, the transaction processing node 212 may simply check whether the received transaction request includes a signature of the management device 214 to determine whether the transaction initiator is a sponsored user of the transaction recipient.

Alternatively or additionally, the transaction processing node 212 may determine whether the transaction initiator is a sponsored user of the transaction recipient based on a sponsor relationship between the transaction initiator and the transaction recipient which is recorded on some or all of the nodes of the blockchain platform 210. In this case, the sponsor relationship was published as a block on the blockchain platform 210 in advance, and the transaction processing node 212 may determine whether the transaction initiator is the sponsored user of the transaction recipient based on the sponsor relationship (such as that shown in Table 1 below) recorded on the blockchain platform 210.

In some further embodiments, after the management device 214 determines that the transaction initiator is a sponsored user of the transaction recipient, the management device 214 may further determine whether credit balance of the transaction initiator is greater than or equal to the transaction fee. The determination may be made with reference to credit information dedicated for the sponsored user stored at the management device 214 (such as that shown as credit plan in Table 3 below). The credit information for the sponsored user may be set by the operator of the management device 214 or other supervisor of the management device 214 in advance. The signature information of the transaction recipient will be generated and added into the transaction request only if the credit balance of the transaction initiator is greater than or equal to the transaction fee. In this way, the transaction processing node 212 may determine that the transaction initiator is a sponsored user of the transaction recipient and that the credit balance for the transaction initiator is sufficient by simply checking the presence of the signature information of the management device 214 in the transaction request.

Returning back to FIG. 3, in embodiments that the transaction processing node 212 determines whether the transaction initiator is a sponsored user of the transaction recipient based on the sponsor relationship recorded on the blockchain platform 210, in response to determining that the transaction initiator is a sponsored user of the transaction recipient, the method 300 may further include that the transaction processing node 212 determines whether credit balance of the transaction initiator is greater than or equal to the transaction fee (not shown). The determination may be made with reference to the credit information dedicated for the sponsored user stored on some or all of the nodes of the blockchain platform 210 (such as that shown as credit plan in Table 3 below). The credit information for the sponsored user may be set by the operator of the management device 214 or other supervisor of the management device 214 in advance, and may be published on the blockchain platform 210 as a block.

As to the credit information mentioned above, it indicates at least a credit limit which is an upper limit of amount that the transaction recipient is willing to pay for the transaction fee for the sponsored user. In some embodiments, the credit information stored at the management device 214 or the blockchain platform 210 may further include a used credit which indicates the amount that the transaction recipient has paid for the transaction fee for the sponsored user. In this case, the credit balance may be determined based on the credit limit and the used credit. For example, the credit balance may be determined by the following formula (1):

$$\text{credit balance} = \text{credit limit} - \text{used credit} \qquad (1).$$

In some embodiments, in addition to the credit limit and the used credit, the credit information may further include a credit restoring rate and a height of blocks. The credit restoring rate indicates an amount of credit to be restored for the sponsored user by each block being passed, and the height of blocks indicates a number of blocks passed from last time that the transaction recipient pays the transaction fee for the transaction initiator (the sponsored user). Obviously, the amount of credit to be restored by each block cannot be greater than the credit limit. In this case, the credit balance may be determined by the following formula (2):

$$\text{credit balance} = \text{credit limit} - \text{used credit} + \text{height of blocks} * \text{credit restoring rate} \qquad (2).$$

Alternatively, the credit plan may be in form of the number of times for sponsor payment by the transaction recipient for the sponsored user. In this case, the credit information may indicate at least a credit payment number limit and a used credit payment number. The credit payment number limit may be an upper limit of times that the transaction recipient is willing to pay for the transaction fee for the sponsored user, and the used credit payment number may indicate the times that the transaction recipient has paid for the transaction fee for the sponsored user. In this case, the credit balance may be determined by the following formula (3):

$$\text{credit balance} = \text{credit payment number limit} - \text{used credit payment number} \qquad (3).$$

At block 308, when the transaction processing node 212 determines that the transaction initiator is a sponsored user of the transaction recipient (and the credit balance is sufficient for the transaction fee in some further embodiments), it further determines a payment account from which the transaction fee is deducted.

In some embodiments, the payment account may be determined by a three-layer model, with which the transaction fee may be deducted according to the following order: the sponsor account, the transaction recipient and the transaction initiator.

In some embodiments, the transaction processing node 212 may determine whether there is a sponsor account associated with the transaction recipient. If the transaction processing node 212 determines that there is a sponsor account associated with the transaction recipient, the transaction processing node 212 may further determine whether the balance of the sponsor account is greater than or equal to the transaction fee. If it is determined that the balance of the sponsor account is greater than or equal to the transaction fee, the transaction processing node 212 may determine the sponsor account as the payment account and deduct the transaction fee from the sponsor account. On the other hand, if the transaction processing node 212 determines that there is not a sponsor account associated with the transaction recipient or determines that the balance of the sponsor account is less than the transaction fee, the transaction processing node 212 may determine whether the balance of a second account of the transaction recipient is greater than or equal to the transaction fee.

If the transaction processing node 212 determines that the balance of the second account of the transaction recipient is greater than or equal to the transaction fee, the transaction processing node 212 may determine the second account of the transaction recipient as the payment account and deduct the transaction fee from the second account of the transaction recipient. On the other hand, if the transaction processing node 212 determines that the balance of the second account of the transaction recipient is less than the transaction fee, the transaction processing node 212 may determine whether balance of a first account of the transaction initiator is greater than or equal to the transaction fee. If the transaction processing node 212 determines that the balance of the first account of the transaction initiator is greater than or equal to the transaction fee, the transaction processing node 212 may determine the first account of the transaction initiator as the payment account and deduct the transaction fee from the first account of the transaction initiator.

In the foregoing solution, by the transaction processing node 212 determining the payment account from which the transaction fee is deducted based on the determination that the transaction initiator is the sponsored user of the transaction recipient, the blockchain transaction fee may be paid from a payment account according to a preferred order (for example, the payment account may be any one of the sponsor account, the second account of the transaction recipient and the first account of the transaction initiator). In this way, the ordinary users can use the blockchain services conveniently without paying special attention to use/manage their cryptocurrencies to pay for the transaction fee.

In some embodiments, the method 300 may further comprise, after deducting the transaction fee, if the transaction processing node 212 determines that the transaction content indicates a transfer transaction to transfer a transfer amount of cryptocurrency from the transaction initiator to the transaction recipient, the transaction processing node 212 may further determine whether balance of a third account of the transaction initiator is greater than or equal to the transfer amount. If the transaction processing node 212 determines that the balance of the third account of the transaction initiator is greater than or equal to the transfer amount, it transfers the transfer amount of cryptocurrency from the third account of the transaction initiator to a fourth account of the transaction recipient.

In some embodiments, the transaction fee and the transfer amount may correspond to different types of cryptocurrencies. For example, the first account of the transaction initiator and the second account of the transaction recipient may correspond to a first type of cryptocurrency for the transaction fee, the third account of the transaction initiator and the fourth account of the transaction recipient may correspond to a second type of cryptocurrency for the transfer amount, and the first type is different from the second type. In this case, the transaction processing node 212 may transfer the transfer amount of cryptocurrency from the third account of the transaction initiator to the fourth account of the transaction recipient. In other words, the transaction fee is paid and received in the first type of cryptocurrency, while the cryptocurrency to be transferred is in the second type different from the first type.

In some other embodiments, the transaction fee and the transfer amount may correspond to a same type of cryptocurrency. In this case, the first account and the third account of the transaction initiator may be the same one, and the second account and the fourth account of the transaction recipient may be the same one. The transaction processing node 212 may transfer the transfer amount of cryptocurrency from the first account (i.e., the third account) of the transaction initiator to the second account (i.e., the fourth account) of the transaction recipient.

As stated above, a multi-layer payment model for paying the transaction fees is described. For example, with a three-layer payment model, the transaction fee can be paid by any one of the sponsor account, the account of the transaction recipient or the account of the transaction initiator. In this way, an ordinary user can use the blockchain service like the current normal application without having to pay special attention to the payment of the transaction fee of the blockchain transaction.

Figure 4:
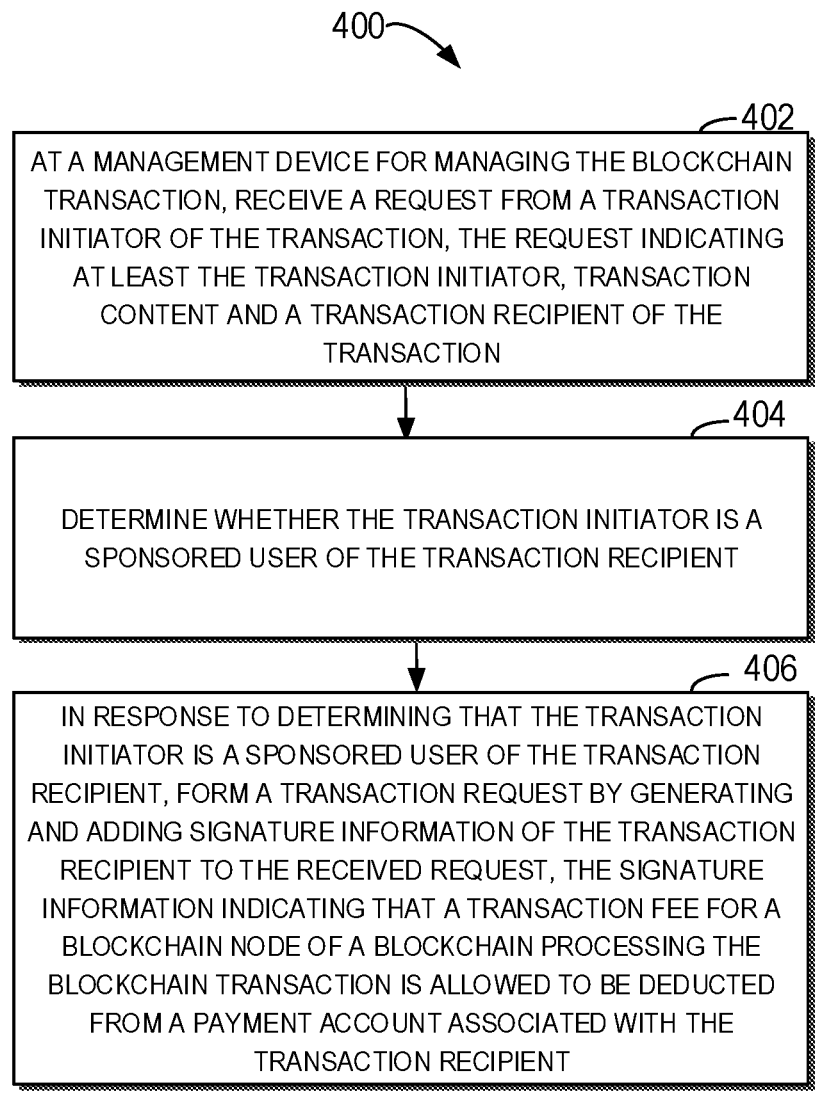
FIG. 4 illustrates a flowchart of a method for managing a blockchain transaction according to embodiments of the present disclosure.

FIG. 4 illustrates a flow diagram of a method 400 for managing a blockchain transaction in accordance with an embodiment of the present disclosure. In FIG. 4, various actions are for example performed by processors of the management device 214 shown in FIG. 2. The method 400 may also include additional actions not shown and/or may omit the actions shown, the scope of the disclosure being not limited in this respect.

At block 402, the management device 214 may receive a request from the transaction initiator. The request may indicate at least the transaction initiator, the transaction content and the transaction recipient of the transaction. In some embodiments, the request is sent from the transaction initiator to the management device 214, i.e., the transaction recipient via the terminal device (a mobile phone, for example) 242.

Figure 5:
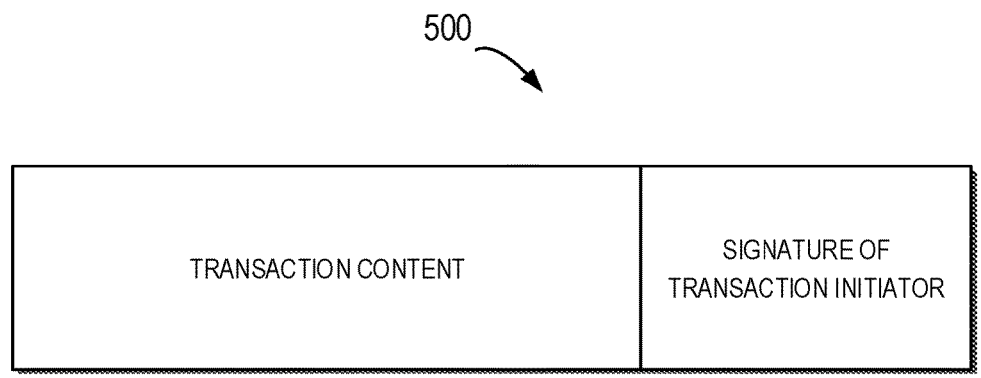
FIG. 5 illustrates a request received by the management device in accordance with an embodiment of the present disclosure.

FIG. 5 illustrates the request 500 received by the management device 214 in accordance with an embodiment of the present disclosure. In FIG. 5, the request 500 includes, among other things, at least the transaction content. Usually, the request 500 further include the signature information of the transaction initiator as shown in FIG. 5. The signature information of the transaction initiator is generated by the terminal device of the transaction initiator signing the transaction content with a private key of the transaction initiator. The signature information of the transaction initiator in the request 500 may be used by the management device 214 or the transaction processing node 212 to authenticate the identity of the transaction initiator. Although not specifically illustrated, the request 500 may further indicate the transaction initiator and the transaction recipient.

At block 404, the management device 214 may determine whether the transaction initiator is a sponsored user of the transaction recipient based on a sponsor relationship between the transaction initiator and the transaction recipient stored at the management device 214. In some embodiments, during an initialization process of the management device 214 and/or the terminal device of the user, the management device 214 may generate or otherwise obtain a sponsor relationship between the sponsored user and the transaction recipient (i.e. the management device 214). Furthermore, the management device 214 may set a credit plan for each sponsored user.

In some embodiments, the sponsor relationship between the transaction initiator and the transaction recipient indicates an association relationship between the sponsored user and the transaction recipient. In some embodiments, the sponsor relationship further indicates the credit information of each sponsored user. For example, the credit information may include a credit plan of each sponsored user.

Tables 1-3 below illustrate the sponsor relationship according to embodiments of the present disclosure. Table 1 as below indicates the association relationship between the recipients and the sponsored users. For example, user 1 is a sponsored user of the recipient 1, user 2 is a sponsored user of the recipient 2 and user 3 is a sponsored user of the recipient 3. In some implementations, the recipients and the sponsored users in Table 1 are indicated by their addresses. The addresses thereof may also be referred to as blockchain addresses, wallet addresses, or sometimes may be referred to as accounts or smart contract accounts. For example, if the management device 214 (a server of a company, for example) hosts more than one smart contract for more than one blockchain applications, each smart contract address may act as the transaction recipient of a transaction request directed to the corresponding smart contract. In this case, the management device 214 may maintain a sponsor relationship including the association relationship as shown in Table 1. In Table 1, it is shown that one recipient corresponds to one sponsored user. However, in most actual implements, one recipient may correspond to more than one sponsored user.

TABLE 1

| Recipient 1 | Sponsored user 1 |
| Recipient 2 | Sponsored user 2 |
| Recipient 3 | Sponsored user 3 |

Table 2 as below indicates the association relationship between the recipients and the sponsor accounts, which indicates that a recipient is associated with the corresponding sponsor account for paying the transaction fee for the recipient. For example, the sponsor account 1 may support sponsor payment of the transaction fee for the recipient 1, the sponsor account 2 may support sponsor payment of the transaction fee for the recipient 2, and the sponsor account 3 may support sponsor payment of the transaction fee for the recipient 3. This is specifically applicable for a situation that a company develops and supports multiple Decentralized applications (DApps). In this case, the management device 214 of the company should host and manage multiple smart contracts for the DApps respectively and each smart contract may act as a recipient of a blockchain transaction. Similarly, in actual implementations, the recipients and the sponsor accounts in Table 2 are indicated by their addresses. In Table 2, it is shown that one recipient corresponds to one sponsor account. However, the present disclosure is not limited thereto, and one sponsor account may correspond to more than one recipient. For example, if the management device 214 (a server of a company, for example) hosts multiple smart contracts for multiple blockchain applications, it may set only one sponsor account for all or some of the smart contracts.

TABLE 2

| Recipient 1 | Sponsor account 1 |
| Recipient 2 | Sponsor account 2 |
| Recipient 3 | Sponsor account 3 |

Table 3 as below indicates the association relationship between the sponsored user and the credit information of the sponsored user. For example, the user 1 has the credit information 1, the user 2 has the credit information 2, and the user 3 has the credit information 3 as shown in Table 3. The credit information may include a credit plan and the credit plan may be configured identically or differently for all sponsored users. The credit information may include at least a credit limit and a used credit for determination of the credit balance of the transaction initiator according to the above formula (1), for example. In this case, Table 3 may be dynamically updated per block. In some further embodiments, the credit information may further include a credit restoring rate and a height of blocks for determination of the credit balance of the transaction initiator according to the above formula (2), for example.

TABLE 3

| Sponsored user 1 | Credit information 1 |
| Sponsored user 2 | Credit information 2 |
| Sponsored user 3 | Credit information 3 |

The sponsor relationship may be published by the management device 214 on the blockchain platform 210 as a block, so as to enable the sponsor relationship to be accessible to the transaction processing node 212 for processing the transaction. The management device 214 may also store the sponsor relationship locally.

Referring back to the above Table 2 which illustrates a relationship between multiple recipients and multiple sponsor accounts. Each recipient in the table is indicated by the address of the recipient in substance. The address of the recipient may be a smart contract address or a normal blockchain address (a non-smart contract address) depending on the nature of the recipient. In case that the company supports multiple DApps for different functions and the management device 214 of the company hosts multiple smart contracts for the DApps, a master account may be configured for the company to configure the sponsor accounts for each of the smart contract addresses or the non-smart contract address. For example, during the initialization process of the management device or the smart contracts, the master account may be used by the management device 214 to determine a sponsor account for each recipient or to determine a sponsor account for all or some recipients hosted in the management device 214. In this manner, by using the smart account, the company may use even a single master account to manage all the smart contracts supported by it.

In some embodiments, if the recipient is a normal blockchain address (i.e., a non-smart contract address), the master account for the recipient may be account of the recipient per se or another account designated by the company.

In some other embodiments, if the recipient is a smart contract address, the master account for the recipient may be the account of the deployer of the smart contract by default. Furthermore, the deployer may transfer this right to another account.

At block 406, if the management device 214 determines that the initiator is a sponsored user of the transaction recipient, the management device 214 will form a transaction request by generating and adding signature information of the transaction recipient to the received request. The signature information indicates that the transaction fee for a blockchain node processing the blockchain transaction is allowed to be paid by the recipient. In some embodiments, the signature information is generated by the management device 214 signing the transaction content with a private key of the transaction recipient. In this case, the transaction processing node 212 will only check whether the received transaction request include the signature of the transaction recipient to determine whether the transaction initiator is a sponsored user of the transaction recipient, instead of retrieving the sponsor relationship from the blockchain platform 210.

Figure 6:
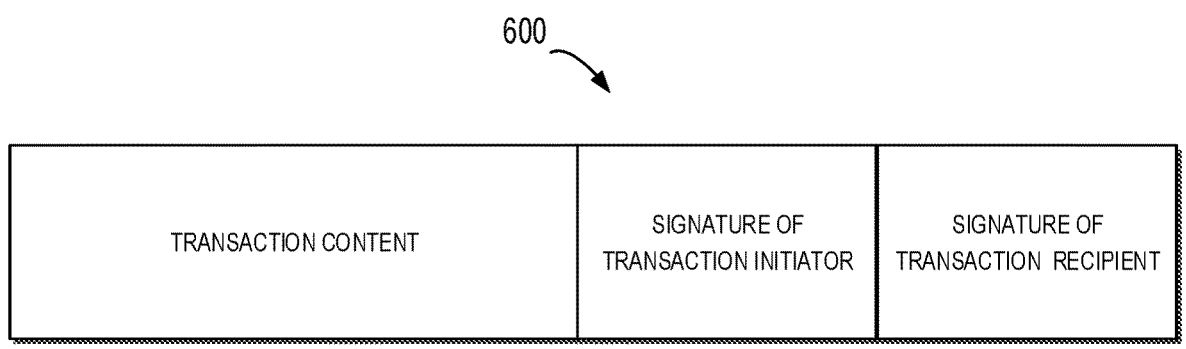
FIG. 6 illustrates a transaction request with signature information of the transaction recipient in accordance with an embodiment of the present disclosure.

FIG. 6 illustrates a transaction request 600 with the signature information of the transaction recipient in accordance with an embodiment of the present disclosure. In FIG. 6, the transaction request 600 further includes, in addition to what is included in the request 500, the signature information of the transaction recipient.

In some embodiments, after the management device 214 determines that the transaction initiator is a sponsored user of the transaction recipient, the management device 214 may additionally determine whether the credit balance of the transaction initiator is greater than or equal to the transaction fee based on the credit information of the transaction initiator recorded at the management device 214. In this case, only if the management device 214 determines that the credit balance of the transaction initiator is greater than or equal to the transaction fee, the management device 214 generates and adds the signature information to the received request to form the transaction request.

As stated above, in the embodiments where the management device 214 stores the sponsor relationship locally, the management device 214 may determine whether to pay for the transaction fee for the transaction initiator and add the signature if it determines to pay for the transaction fee. After receiving the transaction request such as that illustrated in FIG. 6, the transaction processing node 212 may decrypt the received transaction request using the transaction recipient's public key and get the signature information of the recipient. Based on the signature information of the transaction recipient, the transaction processing node 212 may further determine that the received transaction has been confirmed by the transaction recipient to be paid by the recipient. In this case, based on the signature information of the transaction recipient, the transaction processing node 212 may directly determine that the received transaction is a transaction with sponsor payment, and no longer need to make further determination as to whether the transaction initiator is a sponsored user of the transaction recipient.

Figure 7:
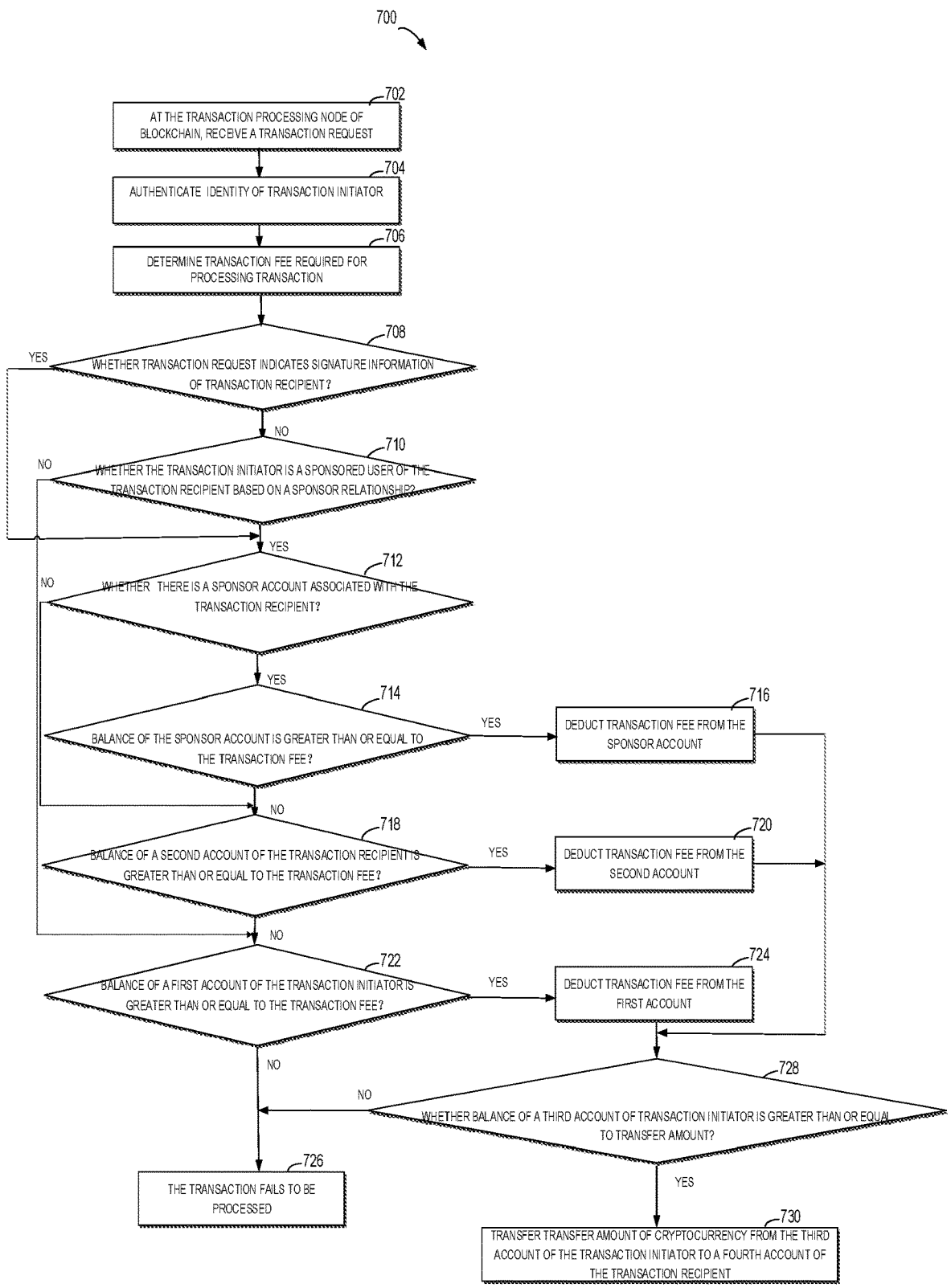
FIG. 7 illustrates a flowchart of a method for processing a blockchain transaction according to embodiments of the present disclosure.

FIG. 7 illustrates a flowchart of a method 700 for processing a blockchain transaction according to embodiments of the present disclosure. In FIG. 7, actions may be implemented by any of the transaction processing nodes 212-1, 212-2 to 212-N. It should be appreciated that the method 700 may further include additional actions not shown and/or the illustrated actions can be omitted, and the scope of the present disclosure is not limited in this respect.

At block 702, the transaction processing node 212 receives the transaction request. The transaction request may indicate at least the transaction initiator, transaction content and the transaction recipient of the transaction. At block 704, the transaction processing node 212 may authenticate the identity of the transaction initiator. At block 706, if the identity of the transaction initiator is successfully authenticated at block 704, the transaction processing node 212 may compute the transaction fee for processing the transaction based on the transaction content indicated in the transaction request.

At block 708, the transaction processing node 212 may determine whether the transaction request indicates signature information of the transaction recipient. If it is determined at block 708 that the transaction request indicates the signature information of the transaction recipient (Yes), which means that the transaction initiator is a sponsored user of the transaction recipient, the method 700 proceeds to block 712. On the other hand, if it is determined at block 708 that the transaction request does not indicate signature information of the transaction recipient (No), at block 710, the transaction processing node 212 may further determine whether the transaction initiator is a sponsored user of the transaction recipient based on the sponsor relationship between the sponsored user and the transaction recipient stored at the transaction processing node 212 or recorded on the blockchain platform 210.

If it is determined at block 710 that the transaction initiator is not a sponsored user of the transaction recipient (No), it means that the transaction is not applicable for the sponsor payment model of the present disclosure and the method 700 proceeds to block 722 to continue the processing of the transaction in a conventional manner, i.e., to try to pay the transaction fee by the transaction initiator. On the other hand, if it is determined at block 708 or block 710 that the transaction initiator is a sponsored user of the transaction recipient (Yes), the method 700 proceeds to apply the sponsor payment model of the present disclosure. In this case, at block 712, the transaction processing node 212 may determine whether there is a sponsor account associated with the transaction recipient.

If it is determined at block 712 that there is a sponsor account associated with the transaction recipient (Yes), the method 700 proceeds to block 714 where the transaction processing node 212 may determine whether the balance of the sponsor account is greater than or equal to the transaction fee. If it is determined at block 714 that the balance of the sponsor account is greater than or equal to the transaction fee (Yes), at block 716, the transaction processing node 212 may deduct the transaction fee from the sponsor account.

On the other hand, if it is determined at block 712 that there is not a sponsor account associated with the transaction recipient (No) or it is determined at block 714 that the balance of the sponsor account is smaller than the transaction fee, the method may proceed to try to pay the transaction fee from the recipient's own account. In this case, at block 718, the transaction processing node 212 may determine whether the balance of a second account of the transaction recipient is greater than or equal to the transaction fee. If it is determined at block 718 that the balance of a second account of the transaction recipient is greater than or equal to the transaction fee (Yes), at block 720, the transaction processing node 212 may deduct the transaction fee from the second account of the transaction recipient.

On the other hand, if it is determined at block 718 that the balance of a second account of the transaction recipient is smaller than the transaction fee (No), the method 700 may proceed in a conventional manner, i.e., to try to pay the transaction fee by the transaction initiator. In this case, at block 722, the transaction processing node 212 may determine whether the balance of a first account of the transaction initiator is greater than or equal to the transaction fee. If it is determined at block 722 that the balance of the first account of the transaction initiator is greater than or equal to the transaction fee (Yes), at block 724, the transaction processing node 212 may deduct the transaction fee from the first account of the transaction initiator.

Until now, the payment of the transaction fee is described. In the following, the transaction processing node 212 may process the transaction according to the transaction content in a conventional manner. The transaction content may indicate that the transaction is to deploy a new smart contract on the blockchain, to transfer an amount of cryptocurrency to the recipient, to call a deployed smart contract on the blockchain or any combination thereof. However, the present disclosure is not limited thereto and the transaction content may indicate any other types of blockchain transactions developed or to be developed in the future. Hereinafter, the additional actions of the method 700 is described taking the transfer transaction as an example.

After the payment of the transaction fee at block 716, 720 or 724, in case that the transaction processing node 212 determines that the transaction content indicates a transfer transaction to transfer a transfer amount of cryptocurrency from the transaction initiator to the transaction recipient, at block 728, the transaction processing node 212 may determine whether the balance of a third account of the transaction initiator is greater than or equal to the transfer amount. If it is determined at block 728 that the balance of the third account of the transaction initiator is greater than or equal to the transfer amount (Yes), at block 730, the transaction processing node 212 may transfer the transfer amount of cryptocurrency from the third account of the transaction initiator to a fourth account of the transaction recipient.

On the other hand, if it is determined at block 722 that the balance of the first account of the transaction initiator is smaller than the transaction fee (No) or if it is determined at block 728 that the balance of the third account of the transaction initiator is smaller than the transfer amount (NO), it is determined that the processing of the transaction is failed at block 726. That is, either the balance of the account is insufficient for the transaction fee or the transfer amount, the whole transaction will be failed. Furthermore, although FIG. 7 illustrate a single block to indicate the transaction is failed, it may include an additional block to indicate the difference causes of the failed transaction.

In the above description, it is assumed that the transaction fee and the transfer amount are in different types of cryptocurrencies. In this case, the transaction initiator has two accounts (i.e., the first account and the third account) with two different types of cryptocurrencies for the transaction fee and the transfer account, respectively. Similarly, the transaction recipient also has two accounts (i.e., the second account and the fourth account) with the two different types of cryptocurrencies for the transaction fee and the transfer account, respectively.

It can be seen from above that unlike the traditional transaction management scheme in which the transaction initiator needs to have sufficient amount of cryptocurrencies for both the transaction fee and the transfer amount, in the implementations described herein, the transaction fee may be paid by the recipient such as the sponsor account associated with the transaction recipient or the second account of the transaction recipient. In this way, the ordinary users can use the blockchain services conveniently, without paying special attention to manage different cryptocurrencies to pay for the transaction fee or the transfer amount.

However, the present disclosure is not limited thereto. The system and the methods may be applied to a scenario in which only one type of cryptocurrency is involved and thus both the transaction fee and the transfer amount is in the same type of cryptocurrency. In this case, the transaction initiator and the transaction recipient may each have only one account with the same type of cryptocurrency. Therefore, at block 728, instead of determining whether the balance of the third account of the transaction initiator is greater than or equal to the transfer amount, it is determined that the balance (in case that the transaction fee is paid by the sponsor account at block 716 or the account of the recipient at block 720) or the updated balance (in case that the transaction fee is paid by the account of the initiator) of the first account of the transaction initiator is greater than or equal to the transfer amount. Accordingly, at block 730, the transfer amount is transferred from the first account of the transaction initiator to the second account of the transaction recipient.

Regarding determination of whether the initiator is a sponsored user of the recipient, the method 700 describes a two-step determination, i.e., blocks 708 and 710. However, it should be understood by those skilled in the art that the determination may be made by only the block 708 or the block 710. That is, whether to check only the signature of the recipient or to make an independent determination based on the sponsor relationship or both, it may be a high level strategy of the whole blockchain configuration.

In some embodiments, the payment model is not limited to the third-layer model described above (blocks 716, 720 and 724, for example), it may be a two-layer one. For example, the transaction processing node 212 may determine the payment account to deduct the transaction fee according to one of the following order: the sponsor account associated with the transaction recipient and the second account of the transaction recipient (blocks 716 and 720), the second account of the transaction recipient and the first account of the transaction initiator (blocks 720 and 724), or the sponsor account and the first account of the transaction initiator (blocks 716 and 724). The flow of FIG. 7 can be modified accordingly.

Figure 8:
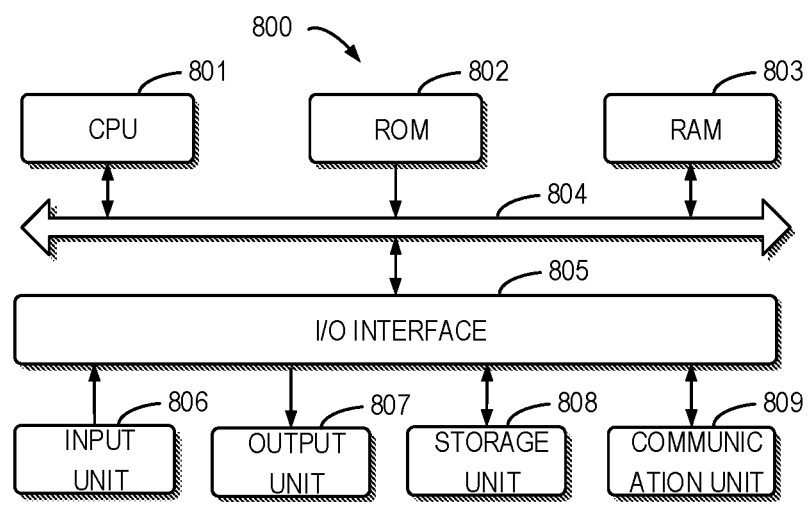
FIG. 8 schematically illustrates a block diagram of an example device suitable for implementing embodiments of the present disclosure.

FIG. 8 illustrates a block diagram of an electronic device 800 adapted to implement implementations of the subject matter described herein. The device 800 may be used to implement one or more hosts (e.g., the management device 214, nodes 212-1, 212-2 to 212-N for transaction processing shown in FIG. 2) of the system 200 shown in FIG. 2. As shown in FIG. 8, the device 800 comprises a central processing unit (CPU) 801 which is capable of performing various actions and processes in accordance with a computer program instruction stored in a read only memory (ROM) 802 or a computer program instruction loaded from a storage unit 808 to a random access memory (RAM) 803. In the RAM 803 are stored various programs and data as required by operation of the device 800. The CPU 801, the ROM 802 and the RAM 803 are connected to one another via a bus 804. An input/output (I/O) interface 805 is also connected to the bus 804.

The following components of the device 800 are connected to the I/O interface 805: an input unit 806 including a keyboard, a mouse, or the like; an output unit 807 including various displays, loudspeakers and the like; the storage unit 808 such as a disk, an optical disk or the like; a communication unit 809 such as a network card, a modem, a wireless communication transceiver or the like. The communication unit 809 allows the device 800 to exchange information/data with other devices through a computer network such as the Internet and/or various telecommunication networks.

The processing unit 801 performs various methods and processing described above, for example, performs the methods 300, 400 and 700. For example, in some embodiments, the methods 300, 400 and 700 may be implemented as a computer software program, which is stored in a machine-readable medium, for example the storage unit 808. In some embodiments, part or the entire computer program may be loaded into and/or installed on the device 800 via the ROM 802 and/or communication unit 809. When the computer program is loaded to the RAM 803 and executed by the CPU 801, one or more operations of the methods 300, 400 and 700 described above may be performed. Alternatively, in other embodiments, the CPU 801 may be configured in any other proper manners (e.g., by virtue of a firmware) to perform one or more actions of the methods 300, 400 and 700.

It needs to be further appreciated that the present disclosure may be a method, an apparatus, a system and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium comprises the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/actions specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which are executed on the computer, other programmable apparatus, or other device implement the functions/actions specified in the flowchart and/or block diagram block or blocks.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, a segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or actions, or combinations of special purpose hardware and computer instructions.

The depictions of the various embodiments of the present disclosure have been presented for purposes of illustration, but are not intended to be exhaustive or limited to the embodiments disclosed. Many modifications and variations will be apparent to those of ordinary skilled in the art without departing from the scope and spirit of the described embodiments. The terminology used herein was chosen to best explain the principles of the embodiments, the practical application or technical improvement over technologies found in the marketplace, or to enable others of ordinary skilled in the art to understand the embodiments disclosed herein.

What are described are only preferred embodiments of the present disclosure, and not intended to limit the present disclosure. Those skilled in the art appreciate that the present disclosure may have various modifications and variations. Any modifications, equivalent substitutes and improvements within the spirit and principles of the present disclosure all fall within the protection scope of the present disclosure.

We claim:

1. A computer-implemented method for processing a blockchain transaction for executing a smart contract of a distributed application (dApp), comprising:
   receiving, by a blockchain node of a blockchain for processing the blockchain transaction, a transaction request from a management device, wherein the transaction request comprises at least a transaction initiator, transaction content and a blockchain address of the smart contract, wherein the transaction request is to request at least one function to be executed by the smart contract;
   computing, by the blockchain node, based on the transaction content, a transaction fee for processing the blockchain transaction;
   determining, by the blockchain node, whether the transaction initiator is a sponsored user of the smart contract, wherein determining whether the transaction initiator is a sponsored user comprises at least one of:
      determining whether the transaction request includes signature information that indicates a sponsored relationship between the transaction initiator and the smart contract preexists the transaction request, wherein the signature information is generated and added to the transaction request by the management device; and
      determining whether the sponsored relationship between the transaction initiator and the smart contract is recorded on the blockchain;
   in response to determining that the transaction initiator is a sponsored user of the smart contract, determining, by the blockchain node, a sponsor account for the smart contract; and
   deducting, by the blockchain node, the transaction fee from the sponsor account based on the sponsored relationship, wherein the sponsor account was specified by an owner of the dApp.

2. The computer-implemented method according to claim 1, wherein determining whether the transaction initiator is a sponsored user of the smart contract includes determining whether the transaction request includes the signature information, further wherein the signature information of the transaction recipient is generated and added to the transaction request by the management device by signing the transaction content with a private key corresponding to the blockchain address of the smart contact in response to determining that the transaction initiator is a sponsored user of the smart contract based on a sponsor relationship between the transaction initiator and the smart contract stored at the management device or on the blockchain.

3. The computer-implemented method according to claim 1, wherein determining whether the transaction initiator is a sponsored user of the smart contract includes determining whether the transaction request includes the signature information, further wherein the signature information is generated and added to the transaction request by the management device further in response to determining that ~credit balance of the transaction initiator is greater than or equal to the transaction fee.

4. The computer-implemented method according to claim 1, further comprising:
   in response to determining that the transaction initiator is not a sponsored user of the smart contract, determining whether a balance of a first account of the transaction initiator is greater than or equal to the transaction fee; and
   in response to determining that the balance of the first account of the transaction initiator is greater than or equal to the transaction fee, determining the first account of the transaction initiator as the payment account.

5. The computer-implemented method according to claim 1, wherein determining a payment account from which the transaction fee is deducted comprises:
   determining whether there is a sponsor account associated with the smart contract;
   in response to determining that there is a sponsor account associated with the smart contract, determining whether a balance of the sponsor account is greater than or equal to the transaction fee; and
   in response to determining that the balance of the sponsor account is greater than or equal to the transaction fee, determining the sponsor account as the payment account.

6. The computer-implemented method according to claim 5, wherein determining a payment account from which the transaction fee is deducted further comprises:
   in response to determining that there is not a sponsor account associated with the smart contract or in response to determining that the balance of the sponsor account is less than the transaction fee, determining whether a balance of a second account of the smart contract is greater than or equal to the transaction fee; and
   in response to determining that the balance of the second account of the smart contract is greater than or equal to the transaction fee, determining the second account of the transaction smart contract as the payment account.

7. The computer-implemented method according to claim 6, wherein determining a payment account from which the transaction fee is deducted comprises:
   in response to determining that the balance of the second account of the smart contract is less than the transaction fee, determining whether balance of a first account of the transaction initiator is greater than or equal to the transaction fee; and
   in response to determining that the balance of the first account of the transaction initiator is greater than or equal to the transaction fee, determining the first account of the transaction initiator as the payment account.

8. The computer-implemented method according to claim 7, further comprising:
   in response to determining that the transaction content indicates a transfer transaction to transfer a transfer amount of cryptocurrency from the transaction initiator to a transaction recipient, determining whether balance of a third account of the transaction initiator is greater than or equal to the transfer amount; and
   in response to determining that the balance of the third account of the transaction initiator is greater than or equal to the transfer amount, transferring the transfer amount of cryptocurrency from the third account of the transaction initiator to a fourth account of the transaction recipient.

9. The computer-implemented method according to claim 8, wherein the first account and the second account correspond to a first type of cryptocurrency, the third account and the fourth account correspond to a second type of cryptocurrency, and the first type is different from the second type.

10. The computer-implemented method according to claim 7, further comprising:
    in response to determining that the transaction content indicates a transfer transaction to transfer a transfer amount of cryptocurrency from the transaction initiator to a transaction recipient, determining whether balance of the first account of the transaction initiator is greater than or equal to the transfer amount; and
    in response to determining that the balance of the first account of the transaction initiator is greater than or equal to the transfer amount, transferring the transfer amount of cryptocurrency from the first account of the transaction initiator to the second account of the transaction recipient, wherein the first account, the second account and the transfer amount of cryptocurrency corresponding to a first type of cryptocurrency.

11. The computer-implemented method according to claim 1, wherein determining a payment account from which the transaction fee is deducted further comprises:
    determining whether ~credit balance of the transaction initiator is greater than or equal to the transaction fee based on credit information of the transaction initiator recorded on the blockchain or stored at the management device; and
    in response to determining that the credit balance of the transaction initiator is greater than or equal to the transaction fee, determining the payment account from which the transaction fee is deducted.

12. The computer-implemented method according to claim 11, wherein the credit information indicates at least one of a credit limit and a used credit.

13. The computer-implemented method according to claim 11, wherein the credit information includes a credit restoring rate and a height of blocks, the credit restoring rate indicating an amount of credit to be restored by each block being passed, the height of blocks indicating a number of blocks passed from a last time that a payment account corresponding to the smart contract or a sponsor account of the smart contract paid a transaction fee for the transaction initiator.

14. The computer-implemented method according to claim 11, wherein the credit information indicates at least a credit payment number limit and a used credit payment number.

15. The computer-implemented method according to claim 1,
    further comprising:
    receiving, by the management device for managing the blockchain transaction, a request from the transaction initiator of the blockchain transaction, wherein the request comprises at least the transaction initiator, the transaction content and the blockchain address of the smart contract, wherein the request is to request at least one function to be executed by the smart contract;

determining, by the management device, whether the transaction initiator is the sponsored user of the smart contract, wherein determining whether the transaction initiator is the sponsored user of the smart contract comprises retrieving information, stored prior to the request, that indicates that the sponsored relationship exists between the transaction initiator and the smart contract; and in response to determining that the transaction initiator is the sponsored user of the smart contract, forming, by the management device, the transaction request by generating and adding the signature information to the received request, the signature information indicating that the transaction fee for the blockchain node of the blockchain processing the blockchain transaction is allowed to be deducted from the payment account associated with the smart contract, wherein the sponsor account was specified by the owner of the dApp.

16. The computer-implemented method according to claim 15, wherein determining whether the transaction initiator is the sponsored user of the smart contract comprises:

determining, based on the sponsor relationship between the transaction initiator and the smart contract stored at the management device, whether the transaction initiator is the sponsored user of the smart contract.

17. The computer-implemented method according to claim 15, wherein forming the transaction request by generating and adding the signature information to the received request comprises:

determining whether a credit balance of the transaction initiator is greater than or equal to the transaction fee based on credit information of the transaction initiator stored at the management device or recorded on the blockchain; and in response to determining that the credit balance of the transaction initiator is greater than or equal to the transaction fee, generating and adding the signature information to the received request by signing the transaction content with a private key.

18. The computer-implemented method according to claim 17, wherein the credit information indicates at least one of a credit limit and a used credit.

19. The computer-implemented method according to claim 17, wherein the credit information further includes a credit restoring rate and a height of blocks, the credit restoring rate indicating an amount of credit to be restored by each block being passed, the height of blocks indicating a number of blocks passed from a last time that a payment account corresponding to the smart contract or a sponsor account of the smart contract paid a transaction fee for the transaction initiator.

20. The computer-implemented method according to claim 17, wherein the credit information indicates at least a credit payment number limit and a used credit payment number.

21. A device for processing a blockchain transaction, the device comprising:

a memory configured to store one or more programs; and a processing unit coupled to the memory and configured to execute said one or more programs to cause the device to perform the method according to claim 1.

22. A device for managing a blockchain transaction, the device comprising:

a memory configured to store one or more programs; and a processing unit coupled to the memory and configured to execute said one or more programs to cause the device to perform the computer-implemented method according to claim 15.

23. A non-transitory computer readable storage medium on which machine executable instructions are stored, the machine executable instructions, when executed, causing a machine to perform the computer-implemented method according to claim 1.

24. A non-transient computer readable medium on which machine executable instructions are stored, the machine executable instructions, when executed, causing a machine to perform steps of the computer-implemented method of claim 15.

25. The computer-implemented method according to claim 1, wherein the transaction comprises transferring a transfer amount of a first cryptocurrency from an initiator account to a recipient account, and the payment account is in a second cryptocurrency that is different from the first cryptocurrency.

26. The computer-implemented method according to claim 13, wherein the credit balance is determined by: credit balance=credit limit−used credit+height of blocks*credit restoring rate.

* * * * *